(12) United States Patent
Kawai et al.

(10) Patent No.: US 10,968,947 B2
(45) Date of Patent: Apr. 6, 2021

(54) TAPERED ROLLER BEARING

(71) Applicant: NTN CORPORATION, Osaka (JP)

(72) Inventors: Takashi Kawai, Shizuoka (JP); Masaya Takaoka, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 16/486,886

(22) PCT Filed: Feb. 16, 2018

(86) PCT No.: PCT/JP2018/005397
§ 371 (c)(1),
(2) Date: Aug. 19, 2019

(87) PCT Pub. No.: WO2018/155320
PCT Pub. Date: Aug. 30, 2018

(65) Prior Publication Data
US 2020/0011375 A1 Jan. 9, 2020

(30) Foreign Application Priority Data

Feb. 21, 2017 (JP) .............................. JP2017-029745

(51) Int. Cl.
*F16C 19/36* (2006.01)
*F16C 33/36* (2006.01)
*F16C 33/58* (2006.01)

(52) U.S. Cl.
CPC .......... *F16C 19/364* (2013.01); *F16C 33/366* (2013.01); *F16C 33/585* (2013.01); *F16C 2240/54* (2013.01)

(58) Field of Classification Search
CPC ... F16C 33/366; F16C 33/585; F16C 2240/54
See application file for complete search history.

(56) References Cited

U.S. PATENT DOCUMENTS 6,328,477 B1  12/2001  Tsujimoto et al.
6,623,168 B2 *  9/2003  Matsuyama .......... F16C 33/366
                                                      384/450
(Continued)

FOREIGN PATENT DOCUMENTS

EP      2 458 237       5/2012
JP      2000-170774     6/2000
(Continued)

OTHER PUBLICATIONS

Extended European Search Report dated Jan. 15, 2020 in European Patent Application No. 18757785.3.
(Continued)

*Primary Examiner* — James Pilkington
(74) *Attorney, Agent, or Firm* — Wenderoth, Lind & Ponack, L.L.P.

(57) ABSTRACT

A tapered roller bearing includes an inner ring having a large flange surface, and tapered rollers having roller large end surfaces. The large flange surface has an arithmetic mean roughness Ra of 0.1 μm≤Ra≤0.2 μm. The large flange surface further has a roughness curve skewness Rsk of −1.0≤Rsk≤−0.3, and a roughness curve kurtosis Rku of 3.0≤Rsk≤5.0. The tapered roller bearing is capable of realizing both stable rotation torque while the bearing is rotating at a low speed, and excellent resistance.

8 Claims, 8 Drawing Sheets

(56) References Cited

U.S. PATENT DOCUMENTS

| | | | |
|---|---|---|---|
| 8,955,225 B2* | 2/2015 | Kobayashi | F16C 33/366 |
| | | | 29/898.13 |
| 9,683,605 B2* | 6/2017 | Murata | F16C 33/6651 |
| 2013/0170780 A1* | 7/2013 | Saito | F16C 33/366 |
| | | | 384/569 |

FOREIGN PATENT DOCUMENTS

| | | |
|---|---|---|
| JP | 2002-139055 | 5/2002 |
| JP | 2004-324670 | 11/2004 |
| JP | 2012-241805 | 12/2012 |
| JP | 2013-92175 | 5/2013 |

OTHER PUBLICATIONS

Translation of the International Preliminary Report on Patentability dated Aug. 27, 2019 in International (PCT) Application No. PCT/JP2018/005397.

* cited by examiner

FIG. 8

| Ra (μm) | Rsk | Rku | Seizure resistance | Stability of torque |
|---|---|---|---|---|
| 0.05 | -3.0 | 6.0 | ◎ | × |
| | | 4.0 | | |
| | | 2.0 | | |
| | -2.0 | 6.0 | ◎ | × |
| | | 4.0 | | |
| | | 2.0 | | |
| | -1.0 | 6.0 | ◎ | × |
| | | 4.0 | | |
| | | 2.0 | | |
| | -0.2 | 6.0 | ◎ | × |
| | | 4.0 | | |
| | | 2.0 | | |
| | -0.1 | 6.0 | ◎ | × |
| | | 4.0 | | |
| | | 2.0 | | |

FIG. 9

| Ra (μm) | Rsk | Rku | Seizure resistance | Stability of torque |
|---|---|---|---|---|
| 0.1 | -3.0 | 6.0 | × | ○ |
| | | 4.0 | △ | ○ |
| | | 2.0 | △ | × |
| | -2.0 | 6.0 | × | ○ |
| | | 4.0 | △ | ○ |
| | | 2.0 | △ | × |
| | -1.0 | 6.0 | × | ○ |
| | | 4.0 | ○ | ○ |
| | | 2.0 | ○ | × |
| | -0.2 | 6.0 | △ | ○ |
| | | 4.0 | △ | △ |
| | | 2.0 | ○ | × |
| | -0.1 | 6.0 | × | ○ |
| | | 4.0 | △ | ○ |
| | | 2.0 | △ | × |

FIG. 10

| Ra (μm) | Rsk | Rku | Seizure resistance | Stability of torque |
|---|---|---|---|---|
| 0.2 | -3.0 | 6.0 | × | ○ |
| | | 4.0 | △ | ○ |
| | | 2.0 | ○ | △ |
| | -2.0 | 6.0 | × | ○ |
| | | 4.0 | △ | ○ |
| | | 2.0 | ○ | △ |
| | -1.0 | 6.0 | × | ○ |
| | | 4.0 | ○ | ○ |
| | | 2.0 | ○ | △ |
| | -0.2 | 6.0 | △ | ○ |
| | | 4.0 | △ | △ |
| | | 2.0 | △ | △ |
| | -0.1 | 6.0 | × | ○ |
| | | 4.0 | × | △ |
| | | 2.0 | △ | △ |

FIG. 11

| Ra (μm) | Rsk | Rku | Seizure resistance | Stability of torque |
|---|---|---|---|---|
| 0.25 | -3.0 | 6.0 | × | ◎ |
| | | 4.0 | | |
| | | 2.0 | | |
| | -2.0 | 6.0 | × | ◎ |
| | | 4.0 | | |
| | | 2.0 | | |
| | -1.0 | 6.0 | × | ◎ |
| | | 4.0 | | |
| | | 2.0 | | |
| | -0.2 | 6.0 | × | ◎ |
| | | 4.0 | | |
| | | 2.0 | | |
| | -0.1 | 6.0 | × | ◎ |
| | | 4.0 | | |
| | | 2.0 | | |

TAPERED ROLLER BEARING

TECHNICAL FIELD

The present invention relates to a tapered roller bearing.

BACKGROUND ART

In a tapered roller bearing, the roller large end surfaces of the tapered rollers come into sliding contact with the large flange surface of the inner ring. In order to prevent seizure between the roller large end surfaces and the large flange surface due to their metal contact, the surface roughness of the large flange surface is adjusted such that a sufficient oil film is formed between the roller large end surfaces and the large flange surface.

When a tapered roller bearing is used in an automotive power transmission path, or in a device such as an industrial machine, a preload is applied to the tapered roller bearing for the purpose of improving the rigidity and rotation accuracy of the tapered roller bearing. In this case, it is necessary to determine an appropriate amount of the preload by measuring the rotation torque of the tapered roller bearing. The rotation torque is measured while rotating the tapered roller bearing at a low speed (normally 100 r/min or less), for the convenience of the step of mounting the tapered roller bearing to a device. While the tapered roller bearing is rotating at a low speed, the rotation torque of the tapered roller bearing is generated mainly by the sliding friction between the roller large end surfaces of the tapered rollers and the large flange surface of the inner ring, and is affected only to a very small degree by the rolling friction generated between the tapered rollers and the inner and outer rings. Therefore, in order to accurately measure the rotation torque of the tapered roller bearing, it is necessary to fully break in the tapered roller bearing at a low rotation speed, while applying a preload to the tapered roller bearing until the roller large end surfaces of the tapered rollers come into contact with the large flange surface of the inner ring (i.e., until the width dimension of the bearing is stabilized).

Japanese Unexamined Patent Application Publication No. 2000-170774 (especially paragraphs [0021] to [0023] of the specification) discloses a tapered roller bearing in which the surface roughness Ra of the large flange surface of the inner ring is set within the range of 0.05 to 0.20 μm so as to maintain appropriate lubrication condition between the large flange surface of the inner ring and the roller large end surfaces of the tapered rollers.

That is, if the surface roughness a of the large flange surface is less than 0.05 μm, when the tapered roller bearing is broken in, the lubrication condition between the large flange surface of the inner ring and the roller large end surfaces of the tapered rollers becomes mixed lubrication which is a mixed state of fluid lubrication and boundary lubrication. As a result thereof, the friction coefficient fluctuates to a large degree, and thus the measured rotation torque also fluctuates to a large degree, thereby making it difficult to accurately manage the preload, in contrast thereto, if the surface roughness Ra of the large flange surface is 0.05 μm or more, the lubrication condition between the large flange surface and the roller large end surfaces becomes boundary lubrication. As a result thereof, the friction coefficient is stabilized, thereby making it possible to accurately manage the preload. While the bearing is rotating at a normal speed exceeding 100 (r/min), a sufficient oil film is formed between the large flange surface and the roller large end surfaces, so that the lubrication condition between the large flange surface and the roller large end surfaces becomes fluid lubrication, and thus the friction coefficient is small. If the surface roughness Ra of the large flange surface is more than 0.20 μm, when the temperature of the bearing rises in the high-speed rotation range, and the viscosity of lubricating oil decreases, an oil film having a sufficient thickness is not formed between the large flange surface and the roller large end surfaces. This may generate seizure between the roller large end surfaces and the large flange surface.

Japanese Unexamined Patent Application Publication No. 2002-139055 (especially paragraph [0021] of the specification) discloses a tapered roller bearing in which the surface roughness Ra of each of the roller large end surfaces of the tapered rollers is set to be 0.1 μm or less, and the surface roughness Ra of the large flange surface of the inner ring is set to be 0.2 μm or less, thereby improving the stability of rotation torque when the bearing is broken in.

In each of the tapered roller bearings of JP 2000-170774 and JP 2002-139055, the surface roughness Ra of the large flange surface of the inner ring is set within the above predetermined range so as to stabilize rotation torque while the bearing is rotating at a low speed with a preload applied to the bearing. However, the above predetermined range covers the roughness level of superfinishing (e.g., Ra=0.08 or less), which may destabilize rotation torque.

If the surface roughness Ra of the large flange surface of the inner ring is larger than the roughness level of superfinishing, it is possible to stabilize rotation torque while the bearing is rotating at a low speed. However, the seizure resistance in this case is inferior compared to when the surface roughness Ra of the large flange surface covers the roughness level of superfinishing.

Thus, simply by setting the surface roughness Ra of the large flange surface, it is difficult to realize both stable rotation torque while the bearing is rotating at a low speed, and excellent seizure resistance between the large flange surface and the roller large end surfaces.

In view of the above background, it is an object of the present invention to provide a tapered roller bearing capable of realizing both stable rotation torque while the bearing is rotating at a low speed, and excellent seizure resistance between the large flange surface and the roller large end surfaces.

SUMMARY OF THE INVENTION

In order to achieve the above object, the present invention provides a tapered roller bearing comprising: tapered rollers each having a roller large end surface; and an inner ring having a large flange surface configured to come into sliding contact with the roller large end surfaces of the tapered rollers, characterized in that the large flange surface has: an arithmetic mean roughness Ra of 0.1 μm≤Ra≤0.2 μm; a roughness curve skewness Rsk of −1.0≤Rsk≤−0.3; and a roughness curve kurtosis Rku of 3.0≤Rku≤5.0.

The arithmetic mean roughness Ra, the roughness curve skewness Rsk, and the roughness curve kurtosis Rku according to the present invention are stipulated in B0601:2013 of the Japanese Industrial Standards (JIS).

In the present invention, since the arithmetic mean roughness Ra of the large flange surface of the inner ring is within the range of 0.1 to 0.2 μm, the large flange surface is suitable for stabilizing rotation torque while the tapered roller bearing is rotating at a low speed, i.e., within the range of 0 to 200 (r/min). However, the large flange surface of which only the arithmetic mean roughness Ra is adjusted in this manner will be inferior in seizure resistance to a surface having a roughness of the super-finished level. Therefore, according to the present invention, the roughness curve skewness Rsk and the roughness curve kurtosis Rku of the large flange surface are also adjusted in the following manner.

Specifically, if the roughness curve skewness Rsk is Rsk<0, i.e., within a negative numerical value range, this means that a larger portion of the roughness curve is located above the average line, which in turn means that a greater area of the large flange surface forms a flat surface, so that an oil film can be formed in a reliable manner. Thus, the roughness curve skewness Rsk of the large-diameter flange surface is set within the range of −1.0 to −0.3. On the other hand, if the roughness curve kurtosis Rku is less than 3.0, the distribution curve of protrusions and recesses distributed on the large flange surface has a flattened shape. However, in order to stabilize rotation torque, higher protrusions on the large flange surface need to be maintained to some extent. Thus, the roughness curve kurtosis Rku is set within the range of 3.0 to 5.0.

By adjusting the Ra, Rsk and Rku values within the above respective ranges, it is possible to realize both stable rotation torque while the bearing is rotating at a low speed, and excellent seizure resistance between the large flange surface and the roller large end surfaces.

For example, the roller large end surface of each of the tapered rollers has an arithmetic mean roughness Ra of 0.1 μm or less. Since bearing functions are less affected by the surface roughnesses of the roller large end surfaces than by the surface roughness of the large flange surface of the inner ring, the surface roughness of each of the roller large end surfaces may be managed based solely on the arithmetic mean roughness Ra, and not based on the skewness Rsk and kurtosis Rku.

For example, the large flange surface has one of: a shape generated by a straight generatrix; a shape generated by a concave generatrix having a maximum depth of 1 μm or less at a mid-portion thereof; and a shape generated by a convex generatrix having a maximum height of 1 μm or less at a mid-portion thereof. The contact between the roller large end surfaces and the large flange surface is ideally the contact between spherical surfaces and a flat surface, because this can realize particularly excellent seizure resistance between the roller large end surfaces and the large flange surface. Therefore, the large flange surface is preferably generated by a substantially straight generatrix within the industrially feasible range. If the large flange surface is generated by a concave generatrix recessed toward its center, or by a convex generatrix bulging toward its center, its maximum height or depth has to be limited to 1 μm, because otherwise, it is impossible to ensure an excellent wedge effect of lubricating oil.

The tapered roller bearing according to the present invention is suitable for use in power transmission devices of an automobile, such as a differential and a transmission, which constitute the power transmission path through which motive power is transmitted from the driving source of the automobile to wheels.

Since the tapered roller bearing of the present invention has a structure as described above, it is possible to realize both stable rotation torque while the bearing is rotating at a low speed, and excellent seizure resistance between the large flange surface and the roller large end surfaces.

BRIEF DESCRIPTION OF THE DRAWINGS

FIG. 8 is a view showing the result of an evaluation test conducted according to the above Example so as to evaluate seizure resistance and the stability of rotation torque, while using various numerical values relative to surface properties of the large flange surface.

FIG. 9 is a view showing the result of an evaluation test conducted according to the above Example so as to evaluate seizure resistance and the stability of rotation torque, while using various numerical values partially different from those of FIG. 8, relative to surface properties of the large flange surface.

FIG. 10 is a view showing the result of an evaluation test conducted according to the above Example so as to evaluate seizure resistance and the stability of rotation torque, while using various numerical values partially different from those of FIGS. 8 and 9, relative to surface properties of the large flange surface.

FIG. 11 is a view showing the result of an evaluation test conducted according to the above Example so as to evaluate seizure resistance and the stability of rotation torque, while using various numerical values partially different from those of FIGS. 8 to 10, relative to surface properties of the large flange surface.

DETAILED DESCRIPTION OF THE INVENTION

A tapered roller bearing 1 embodying the present invention is now described with reference to FIGS. 1 and 2 of the attached drawings.

Figure 1:
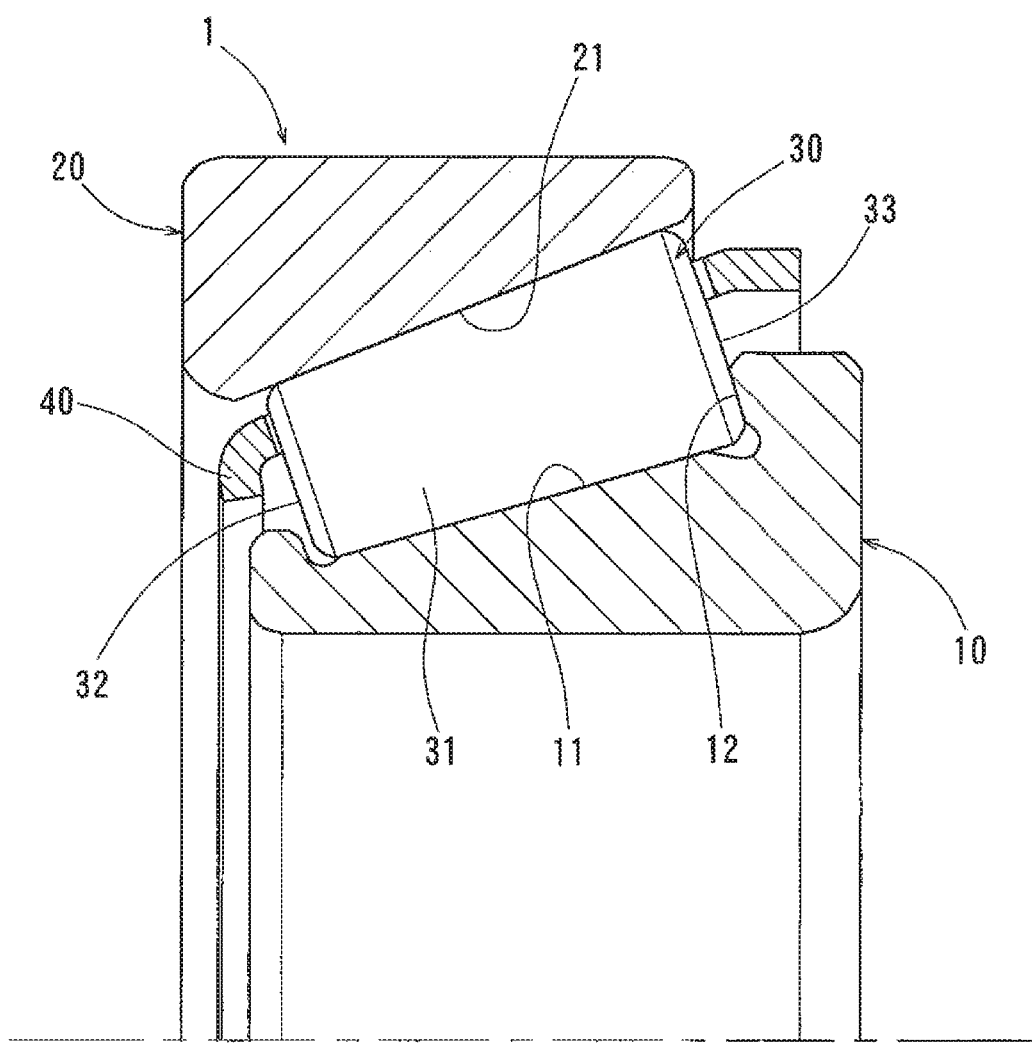
FIG. 1 is a partial sectional view of a tapered roller bearing embodying the present invention.

As illustrated in FIG. 1, the tapered roller bearing 1 includes an inner ring 10, an outer ring 20, a plurality of tapered rollers 30, and a cage 40 retaining the tapered rollers 30.

The inner ring 10, the outer ring 20 and the tapered rollers 30 are made of steel.

The inner ring 10 and the outer ring 20 are annular bearing parts arranged coaxially with each other. The inner ring 10 has a raceway 11 on its outer periphery, and a large flange surface 12. The outer ring 20 has a raceway 21 on its inner periphery. The raceways 11 and 21 comprise conical surfaces.

Each tapered roller 30 has a conical rolling surface 31, a roller small end surface 32, and a roller large end surface 33. The rolling surface 31 is disposed between the raceway 11 of the inner ring 10 and the raceway 21 of the outer ring 20. The roller small end surface 32 is the side surface of the tapered roller 30 at its small-diameter end. The roller large end surface 33 is the side surface of the tapered roller 30 at its large-diameter end.

The roller large end surface 33 is a spherical surface.

The surface roughnesses of the roller large end surfaces 33 of the tapered rollers 30 have a lesser influence on the seizure resistance and other bearing functions than the surface roughness of the large flange surface 12 of the inner ring 10. Therefore, the surface roughness of the roller large end surface 33 of each tapered roller 30 may be managed simply based on the arithmetic mean roughness Ra. Specifically, the arithmetic mean roughness Ra of the roller large end surface 33 is set to be 0.1 μm or less. The term "arithmetic mean roughness Ra", as used herein, refers to the arithmetic mean roughness Ra stipulated in 4.2.1 of B0601:2013 of the Japanese Industrial Standards (JIS). The unit of the arithmetic mean roughness Ra is μm.

Figure 2:
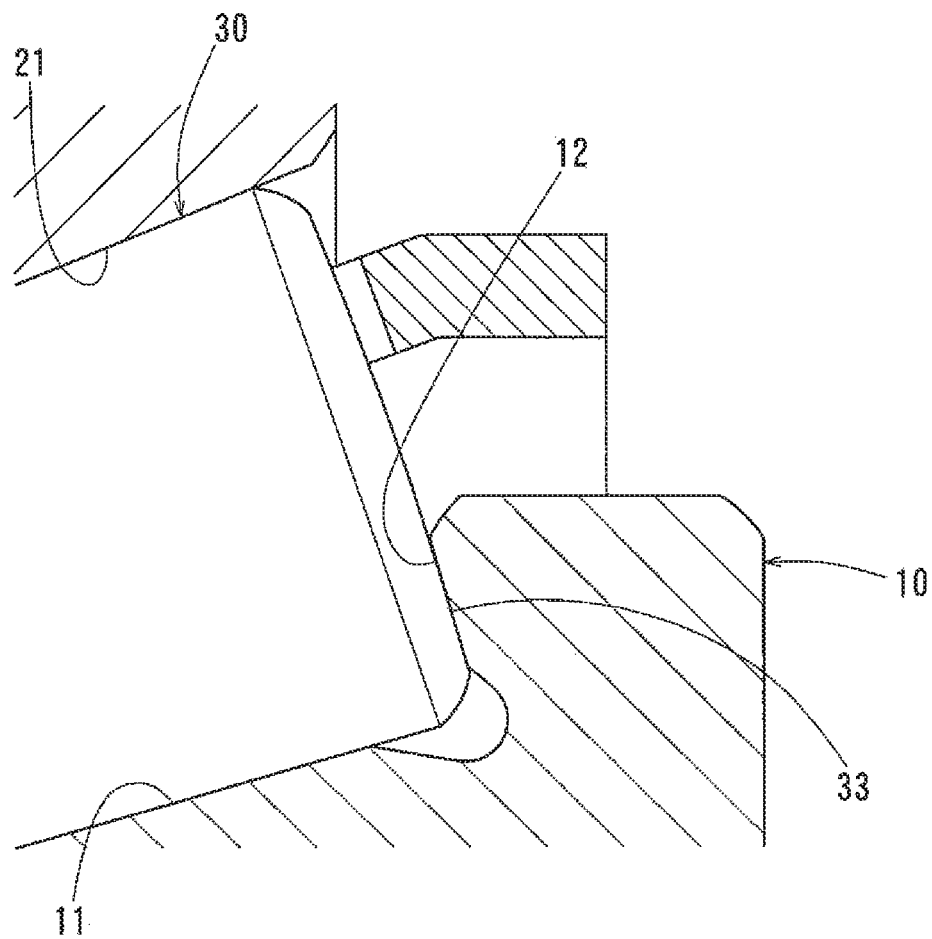
FIG. 2 is an enlarged view illustrating the large flange surface of FIG. 1, and its vicinity.

As illustrated in FIG. 2, the large flange surface 12 of the inner ring 10 comes into sliding contact with the roller large end surfaces 33 of the tapered rollers 30. That is, the large flange surface 12 of the inner ring 10 is a portion of the surface of the inner ring that can come into sliding contact with the roller large end surfaces 33 of the tapered rollers 30 while the bearing is rotating. The large flange surface 12 has a shape generated by a straight generatrix (i.e., a conical shape).

Figure 3:
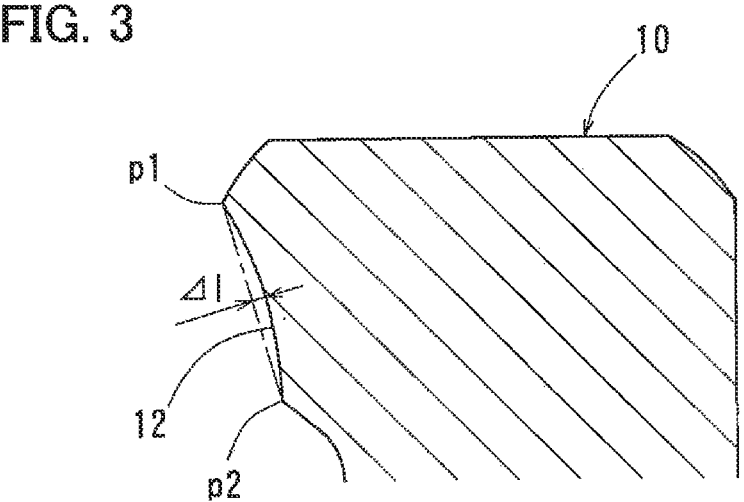
FIG. 3 is a partial sectional view illustrating the large flange surface of FIG. 1 generated by a different generatrix.
Figure 4:
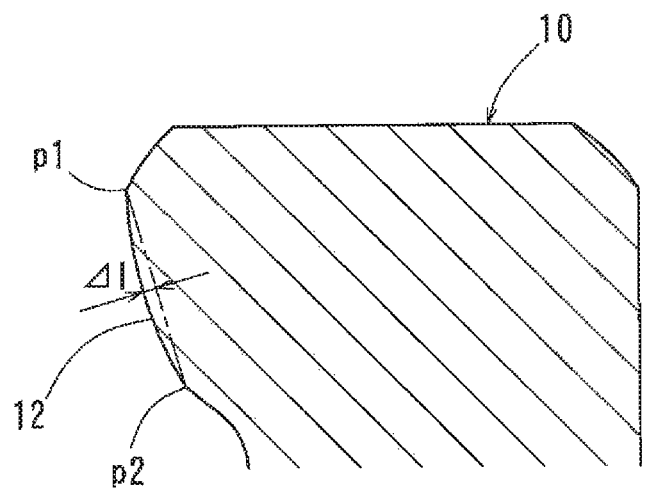
FIG. 4 is a partial sectional view illustrating the large flange surface of FIG. 1 generated by a still different generatrix.

Otherwise, the large flange surface 12 may have a shape generated by a concave generatrix having a maximum depth Δ1 of 1 μm or less, at its mid-portion, as illustrated in FIG. 3, or a shape generated by a convex generatrix having a maximum height Δ1 of 1 μm or less at its mid-portion, as illustrated in FIG. 4. In particular, the concave generatrix is gradually recessed in the direction away from the roller large end surface 33, from both ends p1 and p2 of the concave generatrix toward the center of the straight reference line (see the dashed line in FIG. 3) connecting both ends p1 and p2 of the concave generatrix defining the large flange surface 12. The convex generatrix gradually bulges toward the roller large end surface 33, from both ends p1 and p2 of the convex generatrix toward the center of the imaginary straight reference line (see the dashed line in FIG. 4) connecting both ends p1 and p2 of the convex generatrix.

By using a large flange surface 12 having one of a shape generated by a straight generatrix (see FIG. 2); a shape generated by a concave generatrix having a maximum depth of 1 μm or less at its mid-portion (see FIG. 3); and a shape generated by a convex generatrix having a maximum height of 1 μm or less at its mid-portion (see FIG. 4), the contact between the roller large end surfaces 33 and the large flange surface 12 will be the contact between spherical surfaces and a flat surface, or a contact very similar to this. This ensures an excellent wedge effect of lubricating oil between the roller large end surfaces 33 and the large flange surface 12.

The large flange surface 12 has an arithmetic mean roughness Ra of 0.1 μm≤Ra≤0.2 μm. By setting the arithmetic mean roughness Ra of the large flange surface 12 within the range of 0.1 to 0.2 μm, the large flange surface 12 is capable of stabilizing rotation torque while the tapered roller bearing shown in FIG. 1, is rotating at a low speed, i.e., within the range of 0 to 200 (r/min).

The large flange surface 12 has a roughness curve skewness Rsk of 0.1≤Rsk≤−0.3. The term "roughness curve skewness Rsk", as used herein, refers to the roughness curve skewness Rsk stipulated in 4.2.3 of B0601:2013 of the Japanese Industrial Standards (JIS), and defined by the following formula 1.

[Formula 1]

$$Rsk = \frac{1}{Rq^3}\left[\frac{1}{1s}\int_0^{1r} Z^3(x)dx\right] \quad (1)$$

Figure 5:
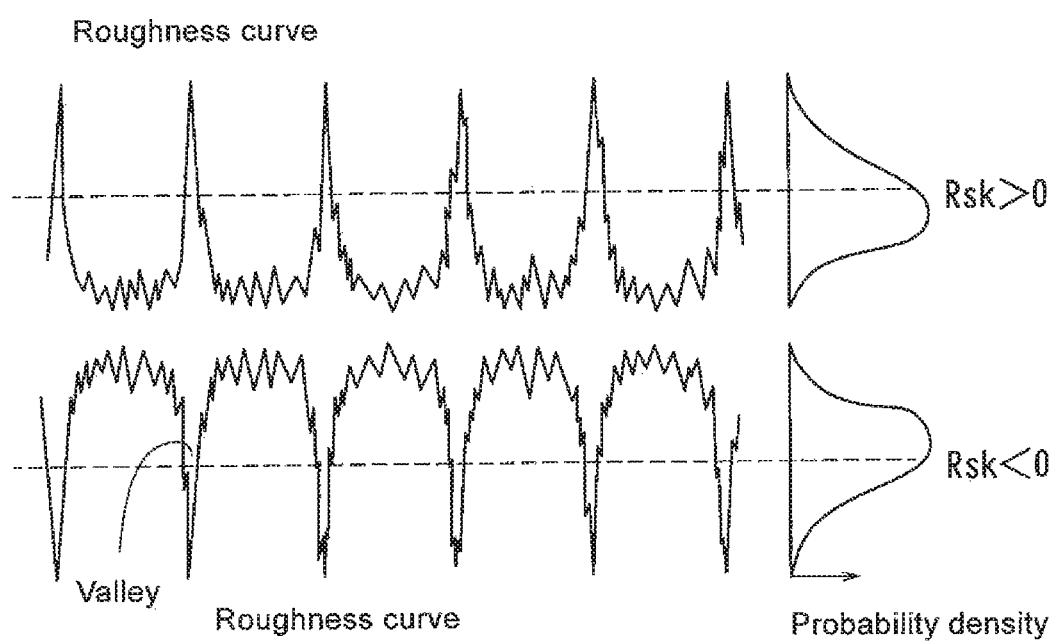
FIG. 5 is a conceptual diagram exemplifying how the large flange surface is affected by respective ranges of the roughness curve skewness Rsk of the large flange surface.

As shown in formula 1, the roughness curve skewness Rsk is the mean of the cubes of Z(x) values within a reference length of a surface to be evaluated, made dimensionless by the cube of the root mean square roughness Rq of the profile curve. The roughness curve skewness Rsk is a numerical value indicative of the degree of asymmetry of the probability density function of the contour curve, and is a parameter strongly affected by protruding peaks and valleys of the profile curve. FIG. 5 exemplifies a roughness curve satisfying the relation skewness Rsk>0, and a roughness curve satisfying the relation skewness Rsk<0. As is apparent from the comparison of these roughness curves, in the case of skewness Rsk<0, the number of protruding peaks is relatively small, so that an oil film is less likely to break on the surface, and thus seizure is less likely to occur. However, the larger the negative value of the skewness Rsk is, the wider the valleys of the roughness curve tends to be, and thus the larger the distances between the adjacent protruding peaks (which means that in the case of the large flange surface of the inner ring of a tapered roller bearing, the distances between portions of the large flange surface that come into contact with the roller large end surfaces are large). If the valleys are too wide, stress concentration will occur at the boundaries between the respective protruding peaks and the adjacent valleys, thereby making it difficult to form an oil film on the surface. By setting the roughness curve skewness Rsk of the large flange surface 12, illustrated in FIG. 2, within the range of −0.1 to −0.3, the large flange surface 12 is practically a flat surface, so that an oil film can be formed reliably thereon.

The large flange surface 12 has a roughness curve kurtosis Rku of 3.0≤Rku≤5.0. The term "roughness curve kurtosis Rku", as used herein, refers to the roughness curve kurtosis Rku stipulated in 4.2.4 of B0601:2013 of the Japanese Industrial Standards (JIS), and defined by the following formula 2.

[Formula 2]

$$Rku = \frac{1}{Rq^4}\left[\frac{1}{1r}\int_0^{1r} Z^4(x)dx\right] \quad (2)$$

Figure 6:
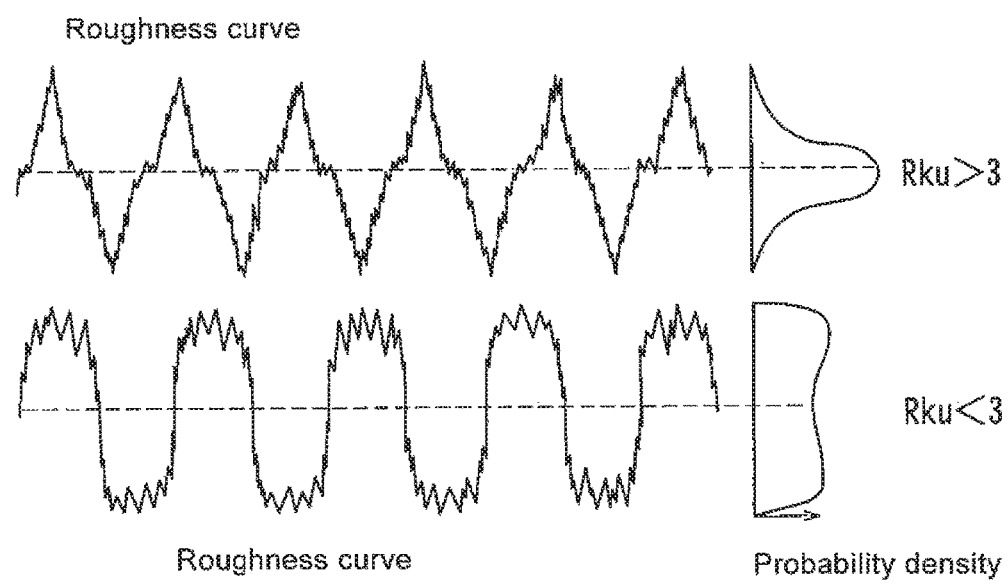
FIG. 6 is a conceptual diagram exemplifying how the large flange surface is affected by respective ranges of the roughness curve kurtosis Rku of the large flange surface.

As shown in formula 2, the roughness curve kurtosis Rku is the mean of the fourth powers of Z(x) values within a reference length of a surface to be evaluated, made dimensionless by the fourth power of the root mean square roughness Rq of the profile curve. The roughness curve kurtosis Rku is a numerical value indicative of the degree of peakedness (steepness) of the probability density function of the contour curve, and is a parameter strongly affected by protruding peaks and valleys of the profile curve. FIG. 6 exemplifies a roughness curve satisfying the relation kurtosis Rku>3, and a roughness curve satisfying the relation kurtosis Rku<3. As is apparent from the comparison of these roughness curves, in the case of kurtosis Rku>3, the peaks tend to be relatively pointed, so that moderate metal contact occurs, thereby stabilizing torque. However, if the positive value of the kurtosis Rku is too large, excessive metal contact tends to occur, so that seizure resistance tends to deteriorate. Thus, by setting the roughness curve kurtosis Rku of the large flange surface 12, illustrated in FIG. 2, within the range of 3.0 to 5.0, the roughness of the large flange surface 12, which is determined by the protrusions thereof, will be such that the large flange surface 12 is capable of stabilizing rotation torque while the bearing is rotating at a low speed.

The arithmetic mean roughness Ra, the roughness curve skewness Rsk, and the roughness curve kurtosis Rku can be all measured by a surface roughness measuring device.

Since the roughness of the large flange surface 12 of the tapered roller bearing 1 according to the present in is determined such that the arithmetic mean roughness Ra is within the range of 0.1 to 0.2 μm; the roughness curve skewness Rsk is within the range of −0.1 to −0.3; and the roughness curve kurtosis Rku is within the range of 3.0 to 5.0, it is possible to stabilize rotation torque while the bearing is rotating at a low speed, and also improve seizure resistance between the large flange surface 12 and the roller large end surfaces 33.

If the arithmetic mean roughness Ra of the large flange surface 12 is within the range of 0.1 to 0.2 μm, but the roughness curve skewness Rsk and roughness curve kurtosis Rku of the large flange surface 12 are out of the above respective ranges, rotation torque while the bearing is rotating at a low speed may stabilize, but the seizure resistance in this case will be inferior compared to when the arithmetic mean roughness Ra is less than 0.1 μm.

A surface roughness that satisfies all of the above three roughness conditions is so fine that, if attempts are made to form the large flange surface 12 by grinding, the grinding resistance is too large, so that grinding burn may occur. Specifically, since a grinder for grinding has a coarser abrasive surface than a grinder for superfinishing, if attempts are made to form a surface having a roughness level equivalent to a surface roughness Ra of 0.1 to 0.2 μm by grinding, the grinding resistance will be too large. Since, for this reason, it is difficult to finish the large flange surface 12 by grinding, the large flange surface 12 is preferably super-finished to satisfy the above three roughness conditions. For example, by super-finishing the large flange surface 12 in an extremely short time (0.5 seconds to 2 seconds), it is possible to satisfy the above three roughness conditions.

EXAMPLES (First and second) Examples (of the invention) (first and second) Comparative Examples 1, and (first and second) Comparative Examples 2, which are all tapered roller bearings model No. 30307D, were prepared and subjected to rotation torque tests and temperature rise tests.

The Examples, which correspond to the above embodiment, had a large flange surface having an arithmetic mean roughness Ra of 0.149 μm; a roughness curve skewness Rsk of −0.96; and a roughness curve kurtosis Rku of 4.005.

Comparative Examples 1 had a large flange surface having an arithmetic mean roughness Ra of 0.2 μm.

Comparative Examples 2 had a large flange surface having an arithmetic mean roughness Ra of 0.08 μm, which is a roughness level of superfinishing.

The large flange surface of each of Comparative Examples 1 had a roughness curve skewness Rsk of −1.053, and a roughness curve kurtosis Rku of 2.563. The large flange surface of each of Comparative Example 2 had a roughness curve skewness Rsk of −1.298, and a roughness curve kurtosis Rku of 5.103.

The arithmetic mean roughnesses Ra of the roller large end surfaces of the Examples, and Comparative Examples 1 and 2 were 0.1 μm or less and substantially equal to each other.

The first Example, and first Comparative Examples 1 and 2 were subjected to the rotation torque tests under the following common conditions: the number of revolutions of the bearing per minute (r/min) was set within the range of 0 to 200; and antirust oil having a kinematic viscosity of 16.5 min$^2$/s at 40 degrees Celsius, and 3.5 mm$^2$/s at 100 degrees Celsius was applied to the bearing to lubricate the bearing.

Figure 7:
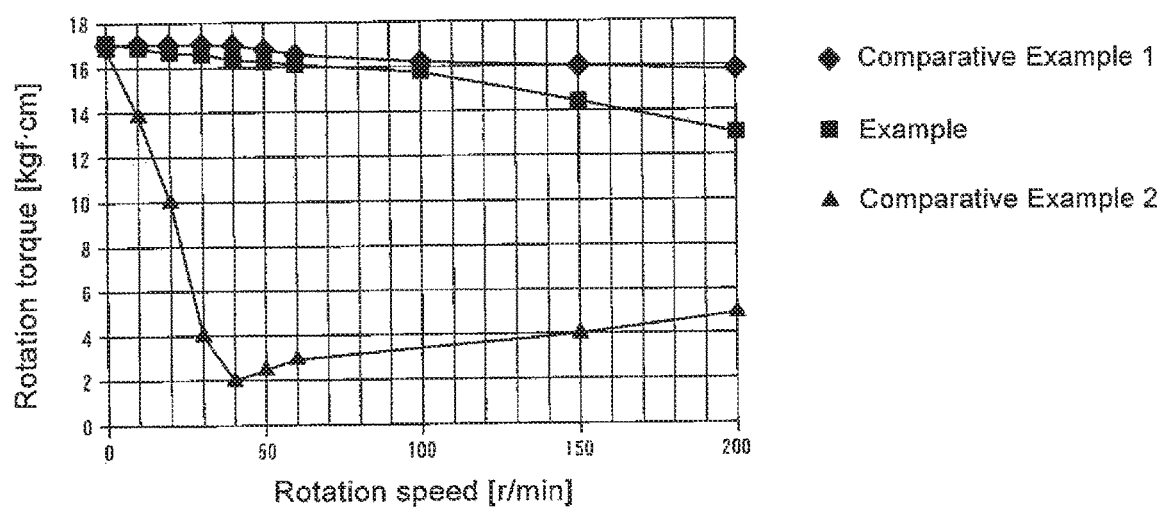
FIG. 7 is a graph showing the relationship between rotation torque and rotation speed in an Example and Comparative Examples.

FIG. 7 shows the measurement results of the rotation torque tests for the Example and Comparative Examples 1 and 2. As is apparent from the comparison of the measurement results in FIG. 7, the Example showed stable torque characteristics substantially equivalent to those of Comparative Example 1, in which the arithmetic mean roughness Ra of the large flange surface is 0.2 μm. The reason why the Example showed such stable torque is apparently because, in the low-speed rotation range of the Example, the wedge effect of the lubricating oil between the large flange surface and the roller large end surfaces is small, so that the oil film therebetween is thin, and as a result, (not mixed lubrication but) boundary lubrication state is present therebetween in the range of 0 to 200 r/min.

On the other hand, in Comparative Example 2, in which the arithmetic mean roughness Ra of the large flange surface is 0.08 μm, the torque value sharply decreases up to 50 r/min. This is apparently because the roughness of the large flange surface of Comparative Example 2 is small, so that an oil film having a sufficient thickness is formed up to 50 r/min, and in the rotation range higher than 50 r/min, the torque value is more strongly affected by the rolling resistance of the rolling surfaces of the tapered rollers. In an actual production line, the preload management (torque check) after assembling tapered roller bearings is performed, in many cases, within the range of 10 to 50 r/min. This means that the Example, which shows stable torque in this rotation range, can be assembled more easily because the preload management is easier.

The second Example, and the second Comparative Examples 1 and 2, which were prepared in the same production lot as the first Example and first Comparative Examples 1 and 2, were subjected to the temperature rise tests under the following common conditions: a radial load of 17 kN and an axial load of 1.5 kN were applied to the bearings; and the bearings were immersed, for lubrication, in turbine oil VG56 to the center axes thereof. In each of the temperature rise tests, the temperature of the outer ring was measured at predetermined numbers of revolutions of the bearing. Table 1 shows the results of the temperature measurement, in which the symbol "O" indicates that the temperature was 120 degrees Celsius or less; the symbol "Δ" indicates that the temperature was more than 120 degrees Celsius and less than 150 degrees Celsius; and the symbol "X" indicates that the temperature was 150 degrees Celsius or more.

TABLE 1

|  | 500 r/min | 1000 r/min | 2000 r/min | 3000 r/min | 4000 r/min | 5000 r/min |
|---|---|---|---|---|---|---|
| Comparative Example 1 | ○ | ○ | Δ | x | — | — |
| Comparative Example 2 | ○ | ○ | ○ | ○ | ○ | ○ |
| Example | ○ | ○ | ○ | ○ | ○ | Δ |

As is apparent from Table 1, the Example showed seizure resistance similar to the seizure resistance in Comparative Example 2, in which the arithmetic mean roughness Ra of the large flange surface is 0.08 μm.

FIGS. 8 to 11 show the results of temperature rise tests and rotation torque tests as described above that were conducted on bearing samples of which the values of the arithmetic mean roughness Ra, the roughness curve skewness Rsk and the roughness curve kurtosis Rku were varied.

As shown in FIG. 8, if the large flange surface has an arithmetic mean roughness Ra of 0.05, which means that the large flange surface is a particularly smooth finished surface, irrespective of whether or not the roughness curve skewness Rsk of the large flange surface is within the range of $-1.0 \leq Rsk \leq -0.3$, and irrespective of whether or not the roughness curve kurtosis Rku of the large flange surface is within the range of $3.0 \leq Rsk \leq 5.0$, the seizure resistance is particularly good, but the stability of torque is particularly low.

As shown in FIGS. 9 and 10, if the large flange surface has an arithmetic mean roughness Ra of 0.1 or 0.2, the seizure resistance tends to be worse than when Ra=0.05, whereas the stability of torque tends to be better than when Ra=0.05. FIGS. 9 and 10 also indicate that if Ra=0.1 or 0.2, and if the roughness curve skewness Rsk of the large flange surface is Rsk<-1.0, a sufficient oil film is less likely to be formed, thus adversely affecting seizure resistance, and that if Ra=0.1 or 0.2 and if Rsk>-0.3, it is impossible to realize both excellent seizure resistance and stable torque irrespective of the value of the roughness curve kurtosis Rku of the large flange surface. FIGS. 9 and 10 further indicate that if Ra=0.1 or 0.2, and if the roughness curve kurtosis Rku of the large flange surface is Rku<3, the stability of torque deteriorates, due to the oil film growing too thick. On the other hand, if Rku>5, minute peaks on the large flange surface tend to be so pointed as to cause the large flange surface to come into metal contact with the roller large end surfaces. As a result thereof, a sufficient oil film is less likely to be formed, thus adversely affecting the seizure resistance.

As shown in FIG. 11, if the arithmetic mean roughness Ra of the large flange surface is 0.25, which means that the large flange surface is a particularly coarse surface, irrespective of whether or not the roughness curve skewness Rsk of the large flange surface is within the range of $-1.0 \leq Rsk \leq -0.3$, and irrespective of whether or not the roughness curve kurtosis Rku of the large flange surface is within the range of $3.0 \leq Rsk \leq 5.0$, seizure resistance is particularly inferior, whereas the stability of torque is particularly excellent.

As a whole, the evaluation results of FIGS. 8 to 11 show that, if the arithmetic mean roughness Ra of the large flange surface is $0.1\ \mu m \leq Ra \leq 0.2\ \mu m$; the roughness curve skewness Rsk of the large flange surface, is $-1.0 \leq Rsk \leq -0.3$; and the roughness curve kurtosis Rku of the large flange surface is $3.0 \leq Rsk \leq 5.0$, it is possible to realize both excellent seizure resistance and stable torque.

Figure 12:
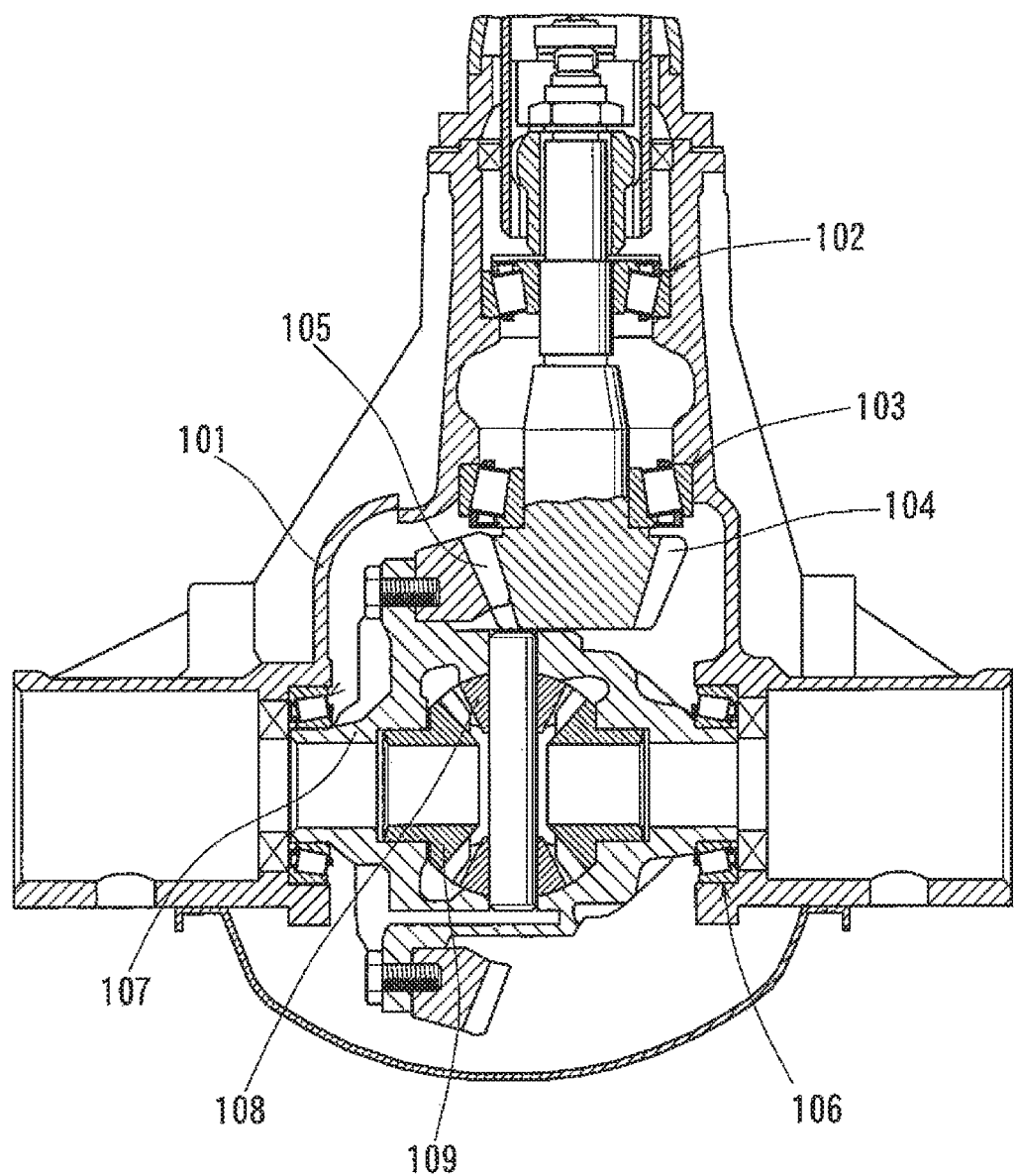
FIG. 12 is a sectional view of an automotive differential in which tapered roller bearings according to the present invention are mounted.

Tapered roller bearings that satisfy the conditions of the present invention are suitably used to support shafts of a power transmission device of an automobile such as a differential or a transmission. This is because tapered roller bearings supporting these shafts have to be broken in at a low rotation speed with a preload applied thereto. FIG. 12 exemplifies tapered roller bearings according to the above embodiment as mounted in the power transmission path of an automobile.

More specifically, FIG. 12 exemplifies a differential constituting the power transmission path of an automobile, and including a drive pinion 104 supported by two tapered roller bearings 102 and 103 so as to be rotatable relative, to a housing 101; a ring gear 105 in mesh with the drive pinion 104; a differential gear case 107 to which the ring gear 105 is attached, and which is supported by a pair of tapered roller bearings 106 so as to be rotatable relative to the housing 101; pinions 108 disposed in the differential gear case 107; and a pair of side gears 109 in mesh with the pinions 108. These elements of the differential are received in the housing 101, in which gear oil is sealed. This gear oil also functions as lubricating oil for the tapered roller bearings 102, 103 and 106. The tapered roller bearings 102, 103 and 106 correspond to the above embodiment.

Figure 13:
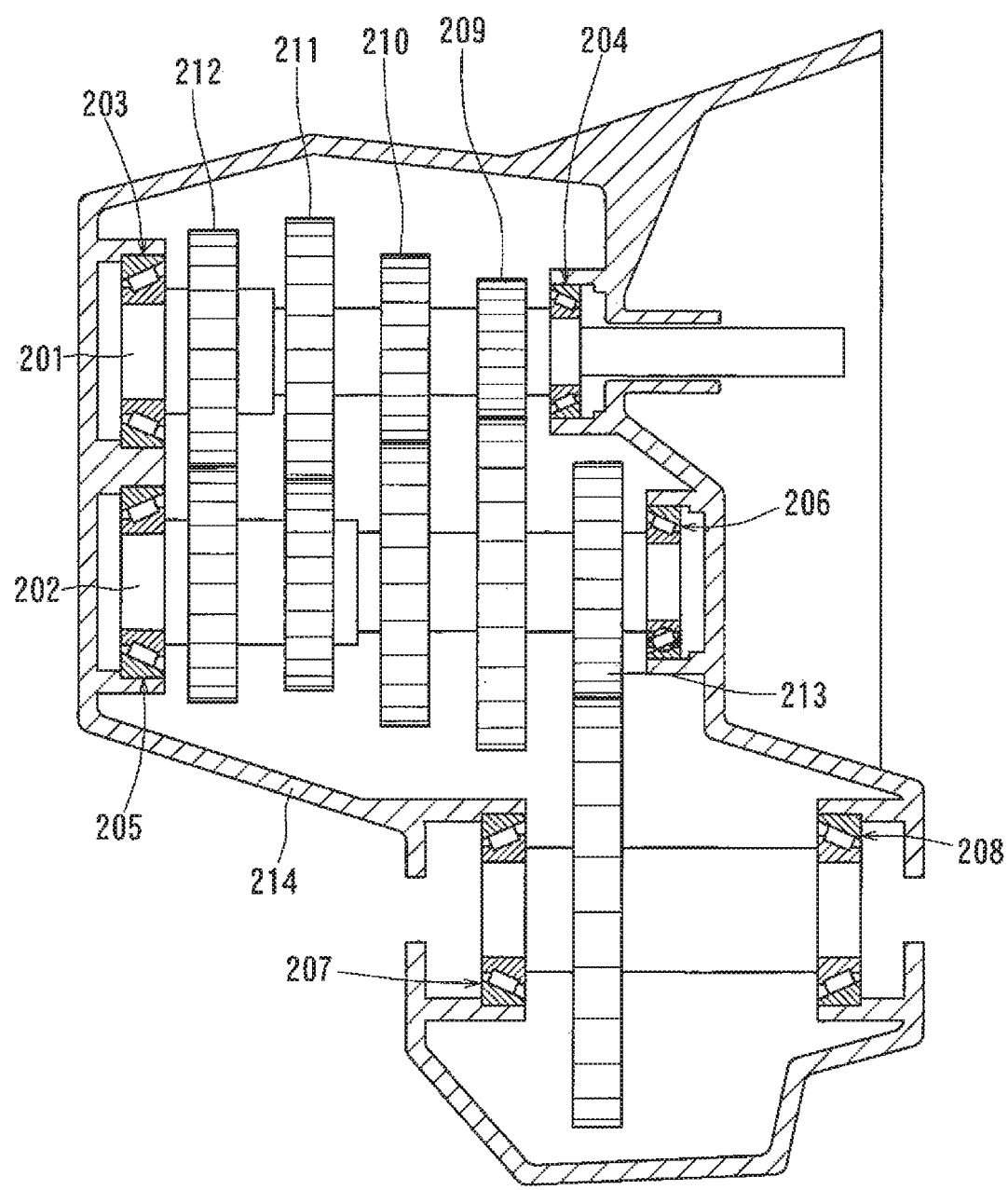
FIG. 13 is a sectional view of an automotive transmission in which tapered roller bearings according to the present invention are mounted.

FIG. 13 exemplifies a transmission constituting the power transmission path of an automobile, in which tapered roller bearings according to the above embodiment are mounted.

The transmission of FIG. 13 is a multistage transmission that changes the gear ratio in a stepwise manner, and includes rolling bearings 203 to 208 comprising tapered roller bearings according to the above embodiment, and rotatably supporting rotary shafts (including an input shaft 201 and an output shaft 202) of the transmission. The shown transmission also includes the above-mentioned input shaft 201, to which the rotation of the engine is input or transmitted; the above-mentioned output shaft 202, which extends parallel to the input shaft 201; a plurality of gear trains 209 to 212 through which the rotation of the input shaft 201 is transmitted to the output shaft 202; and clutches (not shown) mounted between the input shaft 201 and the respective gear trains 209 to 212, or between the output shaft 202 and the respective gear trains 209 to 212. By selectively engaging any one of the clutches, the rotation of the input shaft 201 is transmitted through the selected one of the gear trains 209 to 212 to the output shaft 202 in a selected gear ratio. The rotation of the output shaft 202 is transmitted to an output gear 213, and the rotation of the output gear 213 is transmitted to e.g., a differential. The inputs shaft 201 is rotatably supported by the tapered roller bearings 203 and 204, and the output shaft 202 is rotatably supported by the tapered roller bearings 205 and 206. The shown transmission is configured such that lubricating oil splashed due to the rotation of the output gear, or injected from nozzles (not shown) located within a housing 214 of the transmission is splashed onto the sides of the tapered roller bearings 203 to 208.

The above embodiment and Examples are merely exemplified in every respect, and the present invention is not limited to the above embodiment and Examples. The scope of the present invention is indicated by the claims, and should be understood to include all modifications within the scope and the meaning equivalent to the scope of the claims.

The invention claimed is:

1. A tapered roller bearing comprising:
tapered rollers each having a roller large end surface; and
an inner ring having a large flange surface configured to come into sliding contact with the roller large end surface of each of the tapered rollers,
wherein the large flange surface has:
an arithmetic mean roughness Ra of $0.1\ \mu m \leq Ra \leq 0.2\ \mu m$;
a roughness curve skewness Rsk of $-1.0 \leq Rsk \leq -0.3$; and
a roughness curve kurtosis Rku of $3.0 \leq Rku \leq 5.0$,
wherein the large flange surface has a shape generated by a concave generatrix having a maximum depth of 1 μm or less at a mid-portion thereof.

2. The tapered roller bearing according to claim 1, wherein the roller large end surface of each of the tapered rollers has an arithmetic mean roughness Ra of 0.1 μm or less.

3. The tapered roller bearing according to claim 2, mounted in a power transmission device of an automobile.

4. The tapered roller bearing according to claim 1, mounted in a power transmission device of an automobile.

5. A tapered roller bearing comprising:
tapered rollers each having a roller large end surface; and
an inner ring having a large flange surface configured to come into sliding contact with the roller large end surface of each of the tapered rollers,
wherein the large flange surface has:
an arithmetic mean roughness Ra of $0.1\ \mu m \leq Ra \leq 0.2\ \mu m$;
a roughness curve skewness Rsk of $-1.0 \leq Rsk \leq -0.3$; and
a roughness curve kurtosis Rku of $3.0 \leq Rku \leq 5.0$, and
wherein the large flange surface has a shape generated by a convex generatrix having a maximum height of 1 μm or less at a mid-portion thereof.

6. The tapered roller bearing according to claim 5, wherein the roller large end surface of each of the tapered rollers has an arithmetic mean roughness Ra of 0.1 μm or less.

7. The tapered roller bearing according to claim 6, mounted in a power transmission device of an automobile.

8. The tapered roller bearing according to claim 5, mounted in a power transmission device of an automobile.

* * * * *